US009169377B2

(12) United States Patent
 Nanayakkara

(10) Patent No.: US 9,169,377 B2
(45) Date of Patent: Oct. 27, 2015

(54) SEAL COMPRISING ELASTOMERIC COMPOSITION WITH NANOPARTICLES

(75) Inventor: Saman Chandana Nanayakkara, Rancho Cucamonga, CA (US)

(73) Assignee: Smith International, Inc., Houston, TX (US)

( * ) Notice: Subject to any disclaimer, the term of this patent is extended or adjusted under 35 U.S.C. 154(b) by 1156 days.

(21) Appl. No.: 12/178,378

(22) Filed: Jul. 23, 2008

(65) Prior Publication Data
 US 2010/0018778 A1    Jan. 28, 2010

(51) Int. Cl.
 *C08L 21/00* (2006.01)
 *C08L 27/12* (2006.01)
 *E21B 10/25* (2006.01)
 (Continued)

(52) U.S. Cl.
 CPC .......... *C08L 21/00* (2013.01); *C08L 27/12* (2013.01); *E21B 10/25* (2013.01); *F16J 15/102* (2013.01); *F16J 15/104* (2013.01); *C08K 3/0033* (2013.01); *C08K 3/04* (2013.01); *C08K 3/346* (2013.01); *C08K 3/38* (2013.01); *C08K 7/02* (2013.01); *C08L 2205/02* (2013.01); *C08L 2205/03* (2013.01)

(58) Field of Classification Search
 CPC ......... E21B 4/003; E21B 10/22; E21B 10/25; E21B 2010/22; E21B 210/225; C08L 2205/03; C08L 2205/02; C08L 27/12; C08L 27/14; C08L 27/16; F16J 15/16
 USPC .......... 175/371, 372; 525/191, 199, 208, 232, 525/240; 524/424
 See application file for complete search history.

(56) References Cited

U.S. PATENT DOCUMENTS

| 1,770,045 A | 7/1930 | Shore et al. |
|---|---|---|
| 3,490,986 A * | 1/1970 | Abrabi .......................... 428/372 |

(Continued)

FOREIGN PATENT DOCUMENTS

| EP | 1533468 A1 | 5/2005 |
|---|---|---|
| EP | 1533469 A1 | 5/2005 |

(Continued)

OTHER PUBLICATIONS

Comino et al.; "New Fluoroelastomer Nanocomposites Based on PTFE"; Solvay Ausimont Research & Development Center; Jan. 2008; total 10 pages.

(Continued)

*Primary Examiner* — Elizabeth Gitlin
(74) *Attorney, Agent, or Firm* — Snell & Wilmer L.L.P.

(57) ABSTRACT

Seals and sealing members are formed from a composition generally comprising a first elastomeric material and a second elastomeric material, wherein the second elastomeric material comprises a dispersion of nanosized particles disposed within a polymer matrix of the second elastomeric material. Preferred first and second elastomeric materials are fluoroelastomers, and preferred nanosized particles are fluoropolymers. The nanosized particles are sized less than about 100 nm. The composition comprises about 0.2 to 65 percent by weight of first elastomeric material, about 20 to 95 percent by weight of second elastomeric material, and about 10 to 90 percent by weight particles based on the total weight of the particles and the second elastomeric material. The composition can be used to form annular O-ring seals placed within rotary cone bits used for drilling subterranean formations, and can be used to form a selected portion of the seal or the entire seal.

28 Claims, 2 Drawing Sheets

(51) Int. Cl.

| | | |
|---|---|---|
| *F16J 15/10* | (2006.01) | |
| *C08K 3/00* | (2006.01) | |
| *C08K 3/04* | (2006.01) | |
| *C08K 3/34* | (2006.01) | |
| *C08K 3/38* | (2006.01) | |
| *C08K 7/02* | (2006.01) | |

(56) References Cited

U.S. PATENT DOCUMENTS

| | | | | |
|---|---|---|---|---|
| 3,879,044 | A * | 4/1975 | Estes | 277/651 |
| 4,432,883 | A * | 2/1984 | Denzine et al. | 508/104 |
| 5,323,863 | A | 6/1994 | Denton | |
| 5,402,858 | A * | 4/1995 | Quantz et al. | 175/371 |
| 5,842,700 | A * | 12/1998 | Fang et al. | 277/336 |
| RE36,452 | E * | 12/1999 | Upton et al. | 277/336 |
| 6,123,337 | A * | 9/2000 | Fang et al. | 277/336 |
| 6,305,483 | B1 * | 10/2001 | Portwood | 175/371 |
| 6,406,030 | B1 * | 6/2002 | Fang et al. | 277/407 |
| 6,536,542 | B1 * | 3/2003 | Fang et al. | 175/371 |
| 6,790,425 | B1 | 9/2004 | Smalley et al. | |
| 6,835,366 | B1 | 12/2004 | Margrave et al. | |
| 6,837,317 | B2 * | 1/2005 | Byrd | 175/371 |
| 6,875,412 | B2 | 4/2005 | Margrave et al. | |
| 7,000,712 | B2 * | 2/2006 | Byrd | 175/371 |
| 7,013,998 | B2 | 3/2006 | Ray et al. | |
| 7,048,999 | B2 | 5/2006 | Smalley et al. | |
| 7,105,596 | B2 | 9/2006 | Smalley et al. | |
| 7,122,165 | B2 | 10/2006 | Wong et al. | |
| 7,229,077 | B2 * | 6/2007 | Keshavan et al. | 277/540 |
| RE40,197 | E * | 4/2008 | Ray et al. | 175/371 |
| 7,696,275 | B2 * | 4/2010 | Slay et al. | 524/496 |
| 7,735,583 | B2 * | 6/2010 | Lin | 175/371 |
| 2003/0012905 | A1 * | 1/2003 | Zumbrum et al. | 428/36.4 |
| 2003/0094766 | A1 * | 5/2003 | Byrd | 277/549 |
| 2005/0109544 | A1 | 5/2005 | Ray et al. | |
| 2005/0255030 | A1 | 11/2005 | Tour et al. | |
| 2006/0032673 | A1 * | 2/2006 | Yong et al. | 175/372 |
| 2008/0121436 | A1 * | 5/2008 | Slay et al. | 175/371 |
| 2009/0038858 | A1 | 2/2009 | Griffo et al. | |
| 2009/0127002 | A1 * | 5/2009 | Lin | 175/336 |
| 2009/0152009 | A1 * | 6/2009 | Slay et al. | 175/107 |

FOREIGN PATENT DOCUMENTS

| | | |
|---|---|---|
| EP | 1533468 B1 | 12/2008 |
| EP | 1533469 B1 | 5/2009 |
| WO | 2005014708 A1 | 2/2005 |

OTHER PUBLICATIONS

Solvay Solexis; Tecnoflon® Fluoroelestomers: Fluoroelastomers (FKM) and Perfluoroelastomers (FFKM) for Oil, Gas and Energy Applications; Jan. 2008; total 19 pages.

Combined Search and Examination Report issued in GB Application No. 0814426.3 dated Sep. 18, 2008 (5 pages).

United Kingdom Search and Examination Report for United Kingdom Application No. GB0919748.4, mailed on Dec. 3, 2009 (4 pages).

Examination Report issued in United Kingdom Application No. GB0919748.4 dated Jun. 10, 2010. (1 page).

* cited by examiner

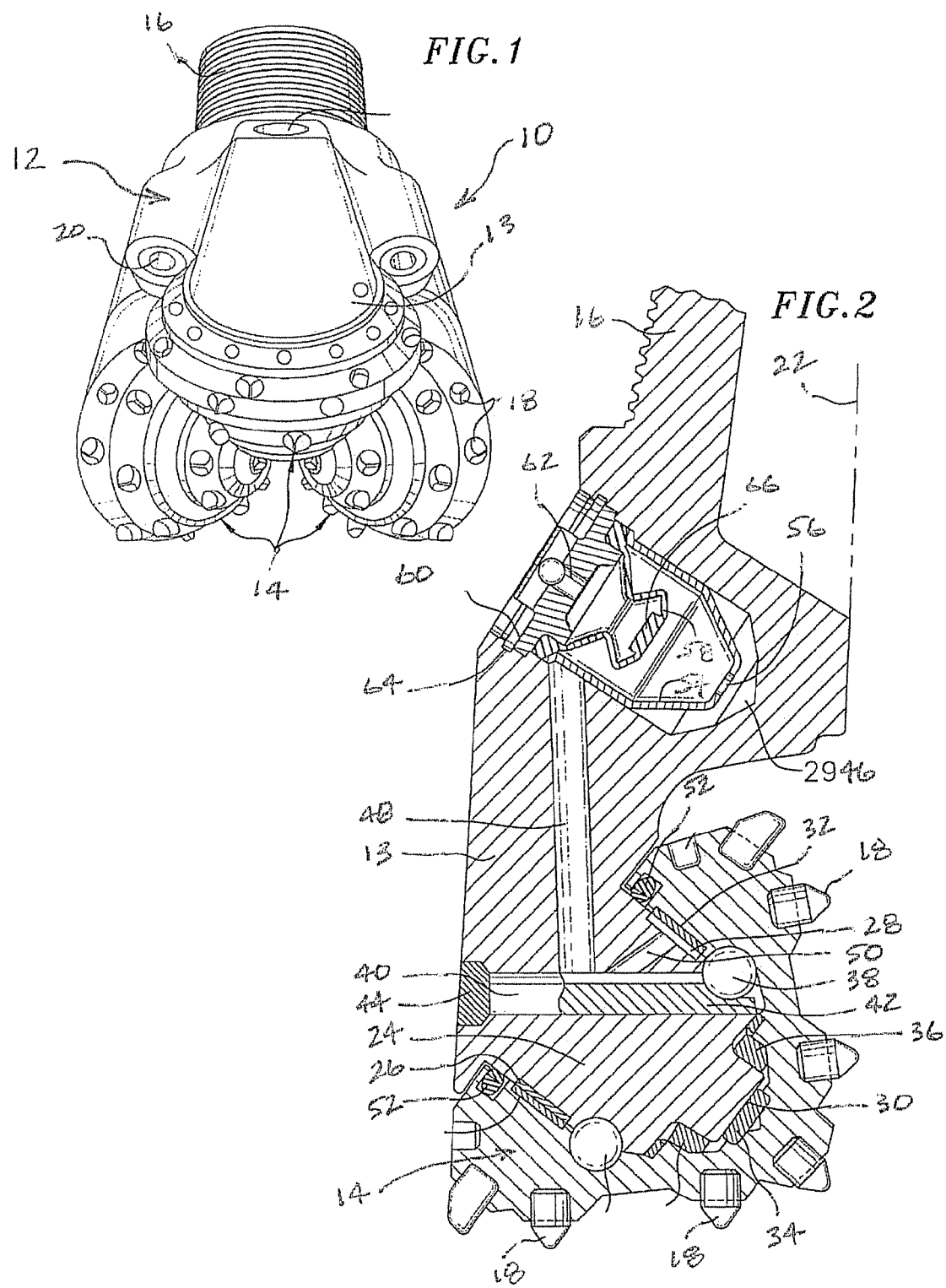

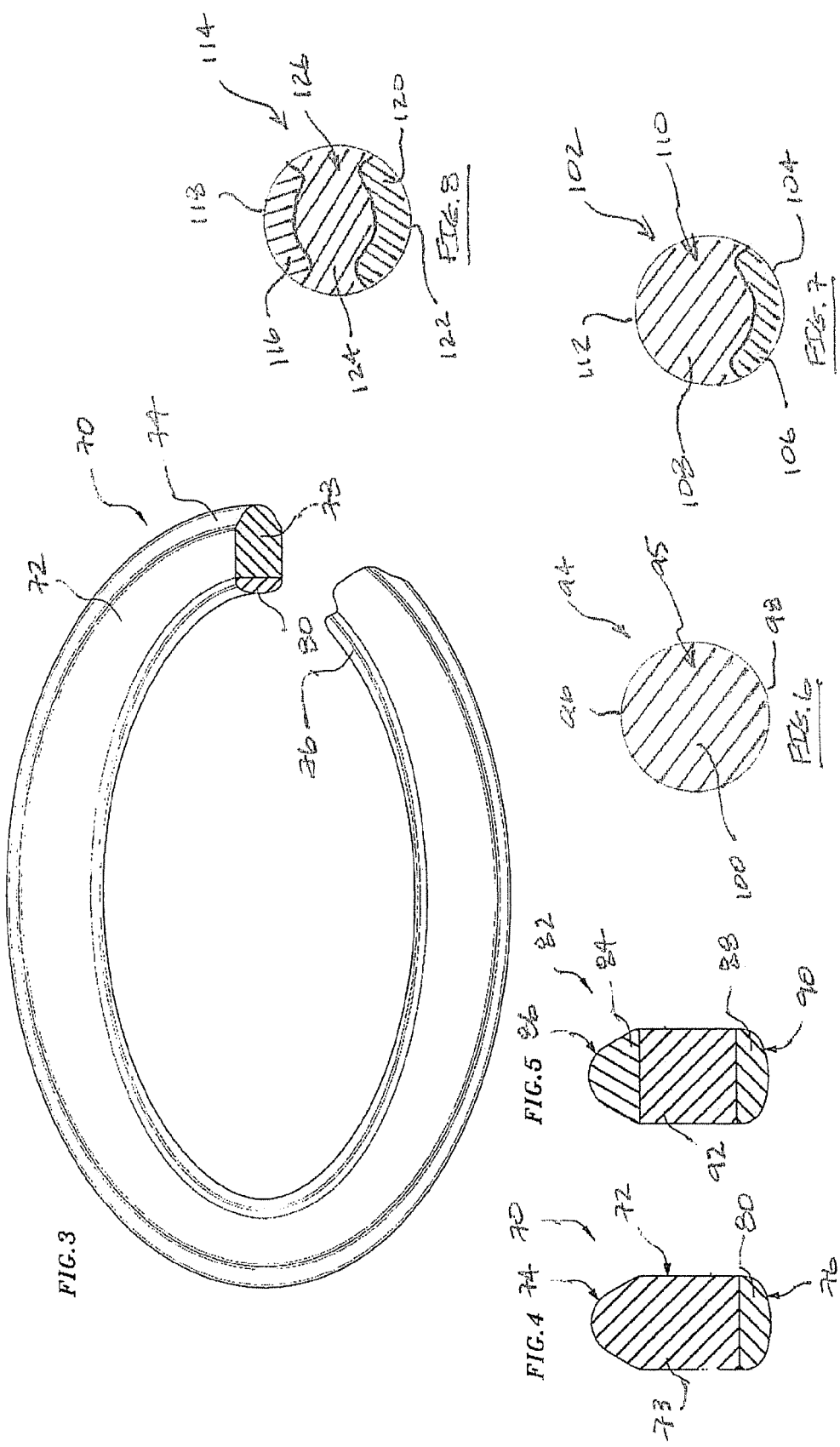

SEAL COMPRISING ELASTOMERIC COMPOSITION WITH NANOPARTICLES

FIELD OF THE INVENTION

This invention relates to seals such as those used with oil production equipment that comprise an elastomeric composition specially formulated to include nanoparticles and that provides improved mechanical properties, fuel resistance, grease resistance, oil-based mud resistance, temperature resistance and wear resistance when compared to seals formed from conventional elastomeric materials.

BACKGROUND OF THE INVENTION

Seals can be used in a variety of end-use applications. One demanding end-use application is with oil production equipment, e.g., such as that used for drilling subterranean formations. An example of such equipment includes rotary cone drill bits that are connected to drill string. In use, the drill string and bit body are rotated in the bore hole where high pressures and temperatures are encountered.

The total useful life of a drill bit in such severe environments is in the order of 20 to 200 hours for bits in sizes of about 6½ to 12¼ inch diameter at depths of about 5,000 to 20,000 feet that are operated at about 200 rpm. Useful lifetimes of about 65 to 150 hours are typical. However, the useful life of drill bits that are operated at higher revolutions such as 375 rpm, i.e., high-speed drill bits, is generally in the range of from about 20 to 50 hours. The shortened useful life is often due to the increased frictional heat produced in the bit caused by the increased operating speed.

When a drill bit wears out or fails as a bore hole is being drilled, it is necessary to withdraw the drill string for replacing the bit. The amount of time required to make a round trip for replacing a bit is essentially lost from the drilling operation. This time can become a significant portion of the total time for completing a well, particularly as the well depths become great. It is therefore quite desirable to maximize the service life of a drill bit in a rock formation. Prolonging the time of drilling minimizes the time lost in "round tripping" the drill string for replacing the bits. Replacement of a drill bit can be required for a number of reasons, including wearing out or breakage of the structure contacting the rock formation.

One reason for replacing the rock bits includes failure or severe wear of the journal bearings. These bearings are subject to high pressure drilling loads, high hydrostatic pressures in the hole being drilled, and high temperatures due to drilling, as well as elevated temperatures in the formation being drilled. Considerable development work has been conducted over the years to produce bearing structures and to employ materials that minimize wear and failure of such bearings.

The journal bearings are lubricated with grease adapted to such severe conditions. Such lubricants are an important element in the life of a rock bit. Pressure and temperature conditions in a drill bit can vary with time as the drill bit is used. For example, when a "joint" of pipe is added to the drill string, weight on the bit can be relieved and slight flexing can occur. Such variations can result in "pumping" of the grease through O-ring seals, leading to loss of grease or introduction of foreign abrasive materials, such as drilling mud, that can damage bearing surfaces. Bearing failure can often be traced to failure of the seal that retains lubricant in the bearing. Lubricant may be lost if the seal fails, or if abrasive particles of rock work their way into the bearing surfaces, causing excessive wear.

Rock bit O-rings are expected to perform in environments that are extremely harsh. Modern bits are being run at exceptionally high surface speeds, sometimes more than 500 feet per minute, with cone speeds averaging in the range of from 200 to 400 revolutions per minute. One face of the O-ring is exposed to abrasive drilling mud. The life of the O-ring may be significantly degraded by high temperatures due to friction (as well as elevated temperature in the well bore) and abrasion.

It is therefore desired that a seal have a material construction that is capable of maintaining the lubricant within oil production equipment, e.g., a drill bit, that has a long useful life, that is resistant to crude gasoline and other chemical compositions found within oil wells, that has high heat resistance, is resistant to abrasion, and that will not readily deform under load and allow leakage of the grease from within the bit or drilling mud into the bit, thereby providing a desired improvement in service life when compared to seals formed from conventional elastomeric materials.

SUMMARY OF THE INVENTION

Seals and sealing members prepared according to principles of this invention are formed from a composition generally comprising a first elastomeric material and a second elastomeric material, wherein the second elastomeric material comprises a dispersion of nanosized particles disposed within a polymer matrix of the second elastomeric material. In an example embodiment, the first and second elastomeric materials can be the same or different, and can be selected from the group of materials including fluoropolymers, fluoroelastomers, acrylonitrile butadiene (nitrile) rubber, highly-saturated nitrile, hydrogenated nitrile, hydrogenated carboxylated acrylonitrile-butadiene rubber, ethylene propylene rubber, ethylene propylene diene monomer, polybutadiene rubber, styrene butadiene co-polymer, polyisoprene rubber, and combinations thereof.

The nanosized particles have an average particle size of less than about 100 nm, and can be formed form the group of materials including fluoropolymers, carbon-based materials, furnace carbon black materials, ground coal materials, graphite materials, boron nitride materials, mica materials, fiber materials, and combinations thereof.

In an example embodiment the first elastomeric material may be present n the range of from about 0.2 to 65 percent by weight of the total composition, and the second elastomeric material present in the range of from about 20 to 95 percent by weight of the total composition, and the composition comprises in the range of from about 10 to 90 percent by weight of the particles based on the total weight of the particles and the second elastomeric material. The composition may have a Shore A hardness at 25° C. of from about 65 to 90, have a modulus of elasticity at 50 percent elongation in the range of from about 300 to 700 psi, have a modulus of elasticity at 100 percent elongation in the range of from about 750 to 1500 psi and have a maximum compression set after 25 percent deflection of the original height for a period of 22 hours at 212° F. of about 12 percent. In an example embodiment, the composition is used to form an annular seal disposed within a rotary cone bit for drilling subterranean formations, wherein the composition can form a specific sealing surface of the seal, wherein the seal comprises a composite construction of different materials, or can form the entire seal. Such seals can be configured as needed to provide a desired sealing service.

Seals and seal members formed from such composition display improved combined properties of modulus, elongation, hardness, compression set, chemical resistance, wear resistance and temperature resistance when compared to seal constructions formed from conventional elastomeric or rubber the comprise conventional fillers, e.g., fillers that are not nano-particles and that are simply added to the elastomeric material, i.e., that are not incorporated during the polymerization stages into the polymer matrix of the elastomeric material.

BRIEF DESCRIPTION OF THE DRAWINGS

These and other features and advantages will become appreciated as the same becomes better understood with reference to the specification, claims and drawings wherein:

FIG. 1 is a semi-schematic perspective view of a rotary cone drill bit containing a seal constructed according to the principles of this invention;

FIG. 2 is a partial cross-sectional view of the rotary cone drill bit of FIG. 1;

FIG. 3 is a perspective view of one embodiment of a seal constructed according to principles of this invention;

FIG. 4 is a cross-sectional view of the seal of FIG. 3;

FIG. 5 is a cross-sectional view of another seal embodiment;

FIG. 6 is a cross-sectional view of another seal embodiment;

FIG. 7 is a cross-sectional view of another seal embodiment; and

FIG. 8 is a cross-sectional view of another seal embodiment.

DETAILED DESCRIPTION

Seals or sealing members formed according to principles of the invention are useful in applications such as in oil production equipment and comprise an elastomeric material composition that has been specially engineered to include nanoparticles dispersed within the polymer matrix of one or more elastomeric materials. In an example embodiment, a volume of nanoparticles formed from a selected group of materials are dispersed within the polymer matrix of a selected host elastomeric material. In an example embodiment, the nanoparticles are introduced or otherwise provided within the host elastomeric material prior to or during the polymerization of the host elastomeric material such that upon the polymerization of the host elastomeric material the nanoparticles are disposed within the polymer matrix of the resulting elastomeric material.

Seals and seal members comprising such elastomeric composition can be used in a variety of different end-use conventional oil production sealing applications. In an example sealing application, the seal or sealing member is provided in the form of an annular seal ring or an O-ring seal. Such O-ring seals can be used for example within a rotary cone drill bit or rock bit that is used for drilling subterranean formations.

FIG. 1 illustrates an example rotary cone drill bit or rock bit 10 comprising a body 12 having a number of cutter cones 14, e.g., three cutter cones, each rotatably mounted on respective legs 13 that extend along a lower end of the body 12. A threaded pin 16 is at the upper end of the body for assembly of the rock bit onto a drill string for drilling oil wells or the like. A plurality of cutting inserts 18 are attached to the cutter cones for bearing on the subterranean formation being drilled. Nozzles 20 in the bit body introduce drilling mud into the space around the cutter cones for cooling and carrying away formation chips drilled by the bit.

O-ring seals are generally thought of as comprising a cylindrical inside and outside diameter, and a cylindrical cross section. Accordingly, for purposes of reference and clarity, the figures used to describe principles and embodiments of this invention have been created to illustrate an annular seal ring. It is to be understood that the principles of this invention are meant to apply to other sealing members that may not be in the form of an annular ring, and to annular seal rings that may have a symmetric or asymmetric cross sectional configuration. Therefore, it is to be understood that the principles of this invention may apply to annular ring seals or O-rings configured having a circular, non-circular, symmetric, or asymmetric cross sectional configurations.

FIG. 2 is a fragmentary, longitudinal cross-section of the rock bit, extending radially from the rotational axis 22 of the rock bit through one of the three legs on which the cutter cones 14 are mounted. Each leg 13 includes a journal pin 24 extending downwardly and radially, inwardly on the rock bit body. The journal pin includes a cylindrical bearing surface having a hard metal insert 26 on a lower portion of the journal pin. The hard metal insert is typically a cobalt or iron-based alloy welded in place in a groove on the journal leg and having a substantially greater hardness that the steel forming the journal pin and rock bit body.

An open groove 28 is provided on the upper portion of the journal pin. Such a groove may, for example, extend around 60 percent or so of the circumference of the journal pin, and the hard metal insert 26 can extend around the remaining 40 percent or so. The journal pin also has a cylindrical nose 30 at its lower end.

Each cutter cone 14 is in the form of a hollow, generally-conical steel body having cutting inserts 18 pressed into holes on the external surface. The inserts may be formed from a cermet material, such as cemented tungsten carbide or the like, and may comprise a working surface comprising an ultra-hard material such as polycrystalline diamond, polycrystalline cubic boron nitride, or the like. The cutting inserts provide the drilling action by engaging a subterranean rock formation as the rock bit is rotated. Some types of bits have hard-faced steel teeth milled on the outside of the cone instead of cutting inserts.

The cavity in the cone contains a cylindrical bearing surface including an aluminum bronze insert 32 deposited in a groove in the steel of the cone or as a floating insert in a groove in the cone. The aluminum bronze insert 32 in the cone engages the hard metal insert 26 on the leg and provides the main bearing surface for the cone on the bit body. A nose button 34 is between the end of the cavity in the cone and the nose 30 and carries the principal thrust loads of the cone on the journal pin. A bushing 36 surrounds the nose and provides additional bearing surface between the cone and journal pin. Other types of bits, particularly for higher rotational speed applications, have roller bearings instead of the exemplary journal bearings illustrated herein. It is to be understood that seals constructed according to principles of this invention may be used with rock bits comprising either roller bearings or conventional journal bearings.

A plurality of bearing balls 38 are fitted into complementary ball races in the cone and on the journal pin. These balls are inserted through a ball passage 40, which extends through the journal pin between the bearing races and the exterior of the rock bit. A cone is first fitted on the journal pin, and then the bearing balls 38 are inserted through the ball passage. The balls carry any thrust loads tending to remove the cone from the journal pin and thereby retain the cone on the journal pin. The balls are retained in the races by a ball retainer 42 inserted through the ball passage 40 after the balls are in place. A plug 44 is then welded into the end of the ball passage to keep the ball retainer in place.

The bearing surfaces between the journal pin and the cone are lubricated by a grease material. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 46 in the rock bit body, which is connected to the ball passage 40 by a lubricant passage 48. Grease also fills the portion of the ball passage adjacent the ball retainer, the open groove 28 on the upper side of the journal pin, and a diagonally extending passage 50 there between. Grease is retained in the bearing structure by a resilient seal in the form of an O-ring 52 disposed between the cone and journal pin. Preferably, the O-ring seal is disposed in a slightly V-shaped groove.

A pressure compensation subassembly is included in the grease reservoir 46. The subassembly comprises a metal cup 54 with an opening 56 at its inner end. A flexible rubber bellows 58 extends into the cup from its outer end. The bellows is held into place by a cap 60 with a vent passage 62. The pressure compensation subassembly is held in the grease reservoir by a snap ring 64 or the like.

When the rock bit is filled with grease, the bearings, the groove 28 on the journal pin, passages in the journal pin, the lubrication passage 48, and the grease reservoir on the outside of the bellows 58 are filled with grease. If the volume of grease expands due to heating, for example, the bellows 58 are contracted to provide additional volume in the sealed grease system, thereby preventing accumulation of excessive pressures. High pressure in the grease system can damage the O-ring seal 52 and permit drilling mud or the like to enter the bearings. Such material is abrasive and can quickly damage the bearings. Conversely, if the grease volume should contract, the bellows can expand to prevent low pressures in the sealed grease system, which could cause flow of abrasive and/or corrosive substances past the O-ring seal.

The bellows has a boss 66 at its inner end which can seat against the cap 60 at one end of the displacement of the bellows for sealing the vent passage 62. The end of the bellows can also seat against the cup 54 at the other end of its stroke, thereby sealing the opening 56. If desired, a pressure relief check valve can also be provided in the grease reservoir for relieving over-pressures in the grease system that could damage the O-ring seal. Even with a pressure compensator, it is believed that occasional differential pressures may exist across the O-ring seal of up to ±150 psi.

To maintain the desired performance of the O-ring seal at the pressure and temperature conditions that prevail in a rock bit, to inhibit "pumping" of the grease through the O-ring seal, and for a long useful service life, it is important that the O-ring seal be resistant to crude gasoline and other chemical compositions found within oil wells, have a high heat and abrasion resistance, have low rubbing friction, and not be readily deformed under the pressure and temperature conditions in a well which could allow leakage of the grease from within the bit or drilling mud into the bit.

Therefore, it is desired that the O-ring seal have a modulus of elasticity at 100 percent elongation of from about 850 to 1275 psi, a minimum tensile strength of about 2300 psi, elongation of from about 200 to 350 percent, a die C tear strength of at least about 250 lb/in., a durometer hardness Shore A in the range of from about 75 to 85, and a compression set after 70 hours at 100° C. of less than about 18 percent and preferably less than about 16 percent.

Conventional seals used in oil production applications such as drill bits have been formed from a variety of different materials. Such seals conventionally comprise acrylonitrile polymers or acrylonitrile/butadiene copolymers. Other components in the polymers are activators or accelerators for curing the polymer, such as stearic acid, and agents that can contribute to the heat resistance of the polymer, such as zinc oxide and curing agents. However, these synthetic rubbers typically exhibit poor heat resistance and become brittle at elevated temperatures after extended periods of time. Additionally, such compounds are known to provide a low degree of chemical resistance, and often exhibit undesirably low tensile strength and high coefficients of friction. Such properties are undesirable for a seal in a drill bit application, since the high operating temperatures of the bit can result in early seal failure, thereby reducing the effective drill bit service life.

Seals and sealing members of the present invention are specially formulated/engineered to include nanoparticles that are dispersed within the polymer matrix of one or more elastomeric materials. The elastomeric material and the nanoparticles are specifically selected to produce a seal composition that will provide a seal construction having desired improvements in performance characteristics to thereby extended seal service life when compared to seals formed from conventional compositions, thereby operating to extend the effective service life of the drill bit or other device comprising the same.

In an example embodiment, the seal comprises an elastomeric material having a desired volume of nanoparticles dispersed therein. More specifically, the nanoparticles are dispersed within a substantially continuous polymer matrix forming the elastomeric material. Such elastomeric material can be referred to the nanoparticle "host" elastomeric material for this reason. In such example embodiment, it is desired that the nanoparticles be dispersed substantially uniformly throughout the polymer matrix forming the elastomeric material. In such embodiment, the nanoparticles can be thought of as a plurality of cores that are each surrounded by a shell formed from the continuous polymer matrix of the elastomeric material. Thus, a feature of such embodiment is the introduction/incorporation and existence of the nanoparticles within the actual polymer matrix or polymer framework of the elastomeric material. In an example embodiment, such introduction can be achieved by introducing the nanoparticles into a precursor elastomeric material at a time before it is polymerized and then subsequently commencing the desired polymerization to form the elastomeric material.

Elastomeric materials useful for forming the nanoparticle host can be selected from the group including but not limited to fluoropolymers, fluoroelastomers, acrylonitrile butadiene (nitrile) rubber, highly-saturated nitrile, hydrogenated nitrile, hydrogenated carboxylated acrylonitrile-butadiene rubber, ethylene propylene rubber, ethylene propylene diene monomer, polybutadiene rubber, styrene butadiene co-polymer, polyisoprene rubber, combinations thereof, and the like. Functionally, it is desired that the nanoparticle host elastomeric material be selected from those materials capable of accommodating the introduction/placement of the nanoparticles dispersion within the polymer matrix during polymerization of the host material. It is also desired that such elastomeric material have desired properties of elongation, modulus, hardness, chemical resistance, and temperature resistance as noted above. It is further desired that the material selected to form the host elastomeric material be compatible with the nanoparticle material that is selected.

The particular choice of host elastomeric material that is used may depend on such factors as the type of material used to form the nanoparticles, the particular end-use application, and any other materials (elastomeric or nonelastomeric) that may be used to form the seal. For example, it may be desired to form a seal using two or more different elastomeric materials, where the nanoparticles are disposed within the polymer matrix of one or more of the elastomeric materials.

In an example embodiment, the nanoparticle host elastomeric material is selected from the group including fluorocarbon, fluoroelastomer, and/or perfluoroelastomer materials, which can include copolymers and terpolymers, and combinations thereof. The use of such fluoroelastomer material is desired for example when the nanoparticles are formed from or have a fluoropolymer constituent. Suitable fluoroelastomer materials include but are not limited to those formed from vinylidene fluoride, hexafluoropropylene, and tetrafluoroethylene. Such fluoroelastomer materials display properties of high-temperature stability, low-temperature toughness and flexibility, low coefficient of friction, wear resistance and good chemical resistance. In a preferred embodiment, the fluoroelastomer material contains one or more of vinylidenefluoride, hexafluoropropylene, tetrafluoroethylene, and includes a cure site monomer.

Seals, prepared according to principals of the invention, can be formulated to comprise the host elastomeric material with the desired nanoparticles disposed therein, wherein such host elastomeric material is the only elastomeric material that is used to make the seal composition. Alternatively, seals can be formulated with the nanoparticle host elastomeric material comprising one of one or more other elastomeric materials. Thus, depending on the particular seal composition embodiment, the host elastomeric material may comprise 100 percent by weight of the total weight of the elastomer material used to form the same, or may comprise some lesser fractional amount depending on the particular seal formulation.

In an example embodiment, where the seal is formed using more than one elastomeric material, the nanoparticle host elastomeric material is present in the range of from about 20 to 95 percent by weight of the total composition, preferably in the range of from about 50 to 90 percent by weight of the total composition, and more preferably in the range of from about 70 to 80 percent by weight of the total composition. Generally, it is desired that the seal composition comprise about 95 percent or less of the host elastomeric so that sufficient amounts of other materials, such as curative agents, cure activator, processing aid, and the like are present. A seal composition comprising less than about 20 percent by weight of the host elastomeric material may not introduce a sufficient amount of the nanoparticle material into the formulation to produce a seal composition having the desired combination of performance properties necessary to meet the demands of a particular end-use application.

While particular amounts of the nanoparticle host elastomeric material have been disclosed, it is to be understood that the actual amounts of such material used to make a seal formulation will depend on a number of different factors such as the type of nanoparticle host elastomeric material that is used, the type and/or amount of the nanoparticle material that is used, the type and/or amount of other elastomeric and/or nonelastomeric materials that are used, the particular seal configuration, the particular seal construction, e.g., whether the seal composition made from such formulation is used to make the entire seal or just a portion or segment of the same, and the end-use application.

The materials used to form the nanoparticles can be selected from the group including but not limited to fluoropolymers, hydrocarbon-based materials, carbon black materials, ground coal materials, graphite materials, boron nitride materials, mica materials, fiber materials, silica materials, clay materials, combinations thereof, and the like. Preferred materials useful for forming the nanoparticles include those that are first capable of forming nano-sized particles. It is further desired that the material used to form the nanoparticles contribute one or more properties of hardness, modulus, elongation, temperature resistance, chemical resistance and the like to the seal construction. It is further desired that the material selected to form the nanoparticles be compatible with the host elastomeric material, and not adversely impact properties and/or performance characteristics of such host elastomeric material once it is polymerized. In a preferred embodiment, it is desired that the material selected to form the nanoparticles be one that compliments and/or operates to stabilize or otherwise enhance the hosting environment provided by the elastomeric material, e.g., that operates to stabilize or strengthen the hosting polymer matrix.

In an example embodiment, e.g., where the host elastomeric material selected is a fluoroelastomeric material, a desired material useful for forming the nanoparticles is a fluoropolymer material. Fluoropolymer materials useful in this regard include those characterized as being semi-crystalline, and include but are not limited to polytetrafluoroethylene, copolymers of tetrafluoroethylene with co-monomers such as perfluoromethylvinylether, perfluoropropylvinylether, and hexafluoropropene, and combinations thereof. A preferred fluoropolymer material useful for forming the nanoparticles is polytetrafluoroethylene.

The particular choice of material used to form the nanoparticles may depend on such factors as the type of host elastomeric material that is used, the particular end-use application, and any other materials (elastomeric or nonelastomeric) that may be used to form the seal composition.

A noted feature of the nanoparticles is that they have an average size of less than about 100 nm, and greater than about 25 nm. In an example embodiment, the nanoparticles have an average particle size in the range of from about 30 to 80 nm, and more preferably in the range of from about 35 to 55 nm. Using nanoparticles having an average particle size greater than about 100 nm may not be desired because the mechanical properties of the resulting elastomer material comprising the same may be considerably lower than what is useful for a particular end-use application, such as a seal within a drill bit. While the use of nanoparticles having an average size of greater than about 25 nm has been disclosed, it is possible that nanoparticles sized smaller that about 25 nm can be used.

In an example embodiment, where the seal is formed using more than one elastomeric material, e.g., using the nanoparticle host elastomeric material and one or more other elastomeric material, the nanoparticles are present in the range of from about 10 to 90 percent by weight of the combined weight of the nanoparticle and host elastomeric material, preferably in the range of from about 12 to 68 percent by weight of the combined weight of the nanoparticle and host elastomeric material, and more preferably in the range of from about 15 to 52 percent by weight of the combined weight of the nanoparticle and host elastomeric material. A seal composition comprising greater than about 90 percent by weight of the nanoparticles in the combined nanoparticle and host elastomeric material may not have sufficient amount of curative agent, cure activator, processing aid, and the like to form a composition having the desired performance properties. A seal composition comprising less than about 10 percent by weight of the nanoparticles in the combined nanoparticle and host elastomeric material may not provide a sufficient amount of the nanoparticle material to produce a seal composition having the desired combination of performance properties noted above to meet the demands of a particular end-use application.

While particular amounts of the nanoparticle material have been disclosed, it is to be understood that the actual amounts of such material used to make a seal formulation will depend on a number of different factors such as the type of nanoparticle material, the type and/or amount of the host elastomeric material that is used, the type and/or amount of other elastomeric and/or nonelastomeric materials that are used, the particular seal configuration, the particular seal construction, e.g., whether the seal composition made from such formulation is used to make the entire seal or just a portion or segment of the same, and the end-use application.

As noted above, seals prepared according to principles of this invention can comprise one or more elastomeric materials. In an example embodiment, the seal comprises one or more elastomeric material in addition to the nanoparticle host elastomeric material. In such embodiment, the nanoparticles are present in the polymer matrix of the hosting elastomeric material, and the hosting elastomeric material is combined with the one or more other elastomeric materials to produce a seal composition that ultimately provides the desired seal performance properties.

Such other elastomeric materials may or may not be ones that are already polymerized before introduction of the nanoparticle host elastomeric material, i.e., the elastomeric material containing the nanoparticles. Thus, depending on the desired formulation and performance properties, the resulting seal composition may be one that includes the nanoparticles in the polymer matrix of one or more of the elastomeric materials, or where the nanoparticles are contained in the polymer matrix of only the host elastomeric material and not in the polymer matrix of other elastomer materials.

Such additional elastomeric materials useful for combining with the nanoparticle host elastomeric material can be selected from the materials including but not limited to fluoropolymers, fluoroelastomers, acrylonitrile butadiene (nitrile) rubber, highly-saturated nitrile, hydrogenated nitrile rubber, hydrogenated carboxylated acrylonitrile-butadiene rubber, ethylene propylene rubber, ethylene propylene diene monomer, polybutadiene rubber, styrene butadiene co-polymer, polyisoprene rubber, combinations thereof, and the like. Functionally, it is desired that such additional elastomeric material be selected from those materials that are both compatible with the nanoparticle host elastomeric material, and capable of contributing desired properties of elongation, modulus, hardness, temperature resistance, and chemical resistance as noted above to the resulting composition.

The particular choice of such additional elastomeric material that is used may depend on such factors as the type of nanoparticle host elastomeric material that is used, the particular end use application, any other materials (additives, modifiers, nonelastomeric materials or the like) that may be used to form the seal. In an example embodiment, e.g., where the nanoparticle host elastomeric material that is used is a fluoropolymer material, the additional elastomeric material is preferably a material that is compatible with the same.

In such example embodiment, the additional elastomeric material can be selected from the group of fluorocarbon, fluoroelastomer and/or perfluoroelastomer materials, which can include copolymers and terpolymers. Suitable fluoroelastomer materials include but are not limited to those formed from vinylidene fluoride, hexafluoropropylene, tetrafluoroethylene, and combinations thereof. Such fluoroelastomer materials display desired properties of high-temperature stability, low-temperature toughness and flexibility, low coefficient of friction, wear resistance and good chemical resistance. In a preferred embodiment, the fluoroelastomer is the same type as that used to form the nanoparticle host elastomeric material In an example embodiment, where the seal is formed using one or more additional elastomeric materials, such additional elastomeric material is present in the range of from about 0.2 to 65 percent by weight of the total composition, preferably in the range of from about 1 to 40 percent by weight of the total composition, and more preferably in the range of from about 2 to 12 percent by weight of the total composition. A seal composition comprising greater than about 65 percent by weight of such additional elastomeric material may limit the ability to provide a desired amount of nanoparticle elastomeric host material in the final compound. While a lower limit of about 0.2 percent by weight of the additional elastomeric material has been disclosed, there may be situations where less about that 0.2 percent by weight of an additional elastomeric material may be useful.

While particular amounts of an additional elastomeric material have been disclosed, it is to be understood that the actual amounts of such material used to make a seal formulation will depend on a number of different factors such as the type of nanoparticle hosting elastomeric material that is used, the type and/or amount of the nanoparticle material that is used, the type and/or amount of other materials such as modifiers, curing agents, and/or nonelastomeric materials that are used, the particular seal configuration, the particular seal construction, e.g., whether the seal composition made from such formulation is used to make the entire seal or just a portion or segment of the same, and the end-use application.

In addition to those materials described above, compositions useful for making seals according to principles of the invention can include other materials such as flow modifiers, curing agents, pigments and coloring agents, and the like.

Flow modifiers and processing agents can be used to control one or more features of the composition during mixing, extruding, calendaring, fabricating, curing, and/or molding, e.g., controlling the viscosity of the composition, reduce unwanted foaming and the like. Such modifiers and processing agents useful in this regard include those that are used for making conventional seal compositions, e.g., from conventional rubber materials. The amount of any such modifiers or agents used to make seals according to the principles of this invention can and will vary depending on a variety of factors. In the event that modifiers and/or processing agents are used they may be present up to about 5 percent by weight based on the weight of the total composition.

Cross linking agents often referred as curing agents are used to create cross-links between the polymer chains of elastomeric materials. Curing agents are employed to cross-link or cure the nanoparticle containing polymer host material. Curing agents useful in this respect include those that conventionally used for curing the selected elastomeric materials and/or nanoparticle material. In an example embodiment, useful curing agents include peroxides, bisphenol, or amines. In the event that curing agents are used, such curing agents can be present up to about 8 percent by weight based on the weight of the total composition.

Pigments and/or coloring agents can be used to provide a seal composition having a desired color or appearance. Pigments and/or coloring agents useful in this respect include those conventionally used for the purpose of coloring elastomeric seal compositions. In the event that pigments and/or coloring agents are used, such pigments and/or coloring agents can be present up to about 5 percent by weight based on the weight of the total composition Fillers in addition to the nanoparticles described above can additionally be used to form seal compositions according to principals of the invention. Such fillers can be added to improve the hardness or rigidity of the seal and/or to reduce the surface friction of the seal. Fillers useful in this respect include those noted above useful for forming the nanoparticle material. If desired, such fillers can be provided in the form of particles, fibers, fabric, and the like. The use of such additional materials can and will vary depending on the nature of the seal composition and, the end-use application, and the desired performance properties. Such additional filling materials or fillers can be added to the host or other elastomeric materials, and may or may not be disposed within the polymer matrix of such elastomeric materials. In an example embodiment, such additional fillers or solids have a particle size of greater than about 100 nm and are combined with the elastomeric materials after they have been polymerized.

Low friction fillers can be used and may include soft metallic materials such as copper, bronze, brass and the like, or hard metallic materials such as nickel, cobalt or the like, or ceramic-metal composite materials such as cemented tungsten carbide, titanium carbide and the like, or may include ceramic materials such as cubic or spherical boron nitride, diamond, diamond-like graphite, silicon carbide and the like. Additionally, such fillers can be provided in the form of fibers and/or fabric formed from fibers. Such fibers can be formed from synthetic or natural materials, and can be sized in length and diameter to provide a desired performance property. In the event that fillers are used, such fillers can be present up to about 20 percent by weight based on the weight of the total composition.

Seals and sealing members constructed in accordance with principles of the invention may be configured differently as called for by the particular end-use applications. As noted above, for use as a seal in a rotary cone drill bit it is desired that the seal be configured in the form of an annular ring or O-ring.

FIGS. 3 and 4 illustrate an example embodiment of a seal 70, formed according to principles of the invention, having an annular ring-shaped body 72. In this particular embodiment, the seal 70 includes an outer diameter sealing surface 74 and an inner diameter sealing surface 76, wherein the outer diameter sealing surface has a radius of curvature that is different from that of the inner diameter sealing surface. In this particular embodiment, the outer diameter sealing surface has a radius of curvature that is less than that of the inner diameter sealing surface. The outer diameter sealing surface 74 is configured to provide a desired seal against a stationary sealing surface of the cone and to provide a desired energizing function, while the inner diameter sealing surface 76 is configured to provide a desired seal against a dynamic sealing surface of the bit body.

The example seal 70 is formed from two different materials; namely a first seal material 78 forming the outer sealing surface 74 and a portion of the seal body, and a second seal material 80 forming the inner sealing surface 76. Thus, the elastomeric nanoparticle seal composition prepared according to principles of this invention can be used to form one or both of the first and second seal materials. In a preferred embodiment, the elastomeric nanoparticle seal composition is used to form the portion of the seal comprising the dynamic sealing surface 76. In this particular embodiment, the first seal material 78 is formed from a material that will operate to provide an energizing function to the seal body, while the second seal material 80 comprises the nanoparticles to provide the desired performance properties noted above at the dynamic sealing surface, e.g., along the inner diameter, where properties of heat resistance and wear resistance are most needed.

FIG. 5 illustrates an alternative embodiment of a seal 82 having the same general configuration as that illustrated in FIGS. 3 and 4, but where the seal is formed from three different materials; namely a first material 84 used to form an outer diameter sealing surface 86, a second material 88 used to form an inner diameter sealing surface 90, and a third material 92 used to form an inner seal body portion that is interposed between the inner and outer sealing surfaces. The elastomeric nanoparticle seal composition can be used to form any one or more of these seal regions. In an example embodiment, the elastomeric nanoparticle seal composition is used to form to provide the desired performance properties noted above at the dynamic sealing surface, e.g., along the inner diameter, where properties of heat resistance and wear resistance are most needed.

While not specifically illustrated, it is to be understood that the seal embodiment illustrated in FIGS. 3 to 5, having the differently configured inner and outer sealing surfaces, can be formed from a single-type of elastomeric material, and that material can be the elastomeric nanoparticle material disclosed above.

FIG. 6 illustrates a further example embodiment of a seal 94, formed according to principals of the invention, having an annular ring-shaped body 95. In this particular embodiment, the seal body has a circular cross-sectional configuration with outer and inner diameter sealing surfaces 96 and 98 having the same radius of curvature. Additionally, in this particular embodiment the seal body and both sealing surfaces are all formed from the same elastomeric material; namely, the elastomeric nanoparticle material disclosed above.

FIG. 7 illustrates an alternative embodiment of a seal 102 that is similar to that illustrated in FIG. 6 in that it has a generally circular cross-sectional configuration. However, the seal 102 comprises an inside diameter sealing surface 104 that is formed from a material 106 different from a material 108 used to form the seal body 110 and an outer diameter sealing surface 112. Like the embodiment illustrated in FIG. 4, the elastomeric nanoparticle seal composition can be used to form any portion of this seal, and in a preferred embodiment is used to provide the desired performance properties noted above at the dynamic sealing surface, e.g., along the inner diameter, where properties of heat resistance and wear resistance are most needed.

FIG. 8 illustrates another alternative embodiment of a seal 114 that is similar to that illustrated in FIG. 6 in that it has a generally circular cross-sectional configuration. However, the seal 114 is formed using three different materials, namely, a first material 116 that is used to form an outer diameter sealing surface 118, a second material 120 that is used to form an inner diameter sealing surface 122, and a third material 124 that is used to form a remaining portion of the seal body 126 interposed between the inner and outer diameter sealing surfaces. Like the embodiment illustrated in FIG. 5, the elastomeric nanoparticle seal composition can be used to form any portion of this seal, and in a preferred embodiment is used to provide the desired performance properties noted above at the dynamic sealing surface, e.g., along the inner diameter, where properties of heat resistance and wear resistance are most needed.

Thus, it is to be understood that elastomeric nanoparticle seal compositions of this invention can be used to form all or part of a seal or seal member depending on the particular seal configuration and the end-use seal application. Additionally, for those seal constructions comprising more than one seal composition or seal material, elastomeric nanoparticle seal compositions of this invention can be used to form such different regions or portions of the seal where the formulation of the elastomeric nanoparticle composition in each such region may be different to provide the particular performance properties called for by the respective different regions. Thus, even though seal constructions may comprise more than one type of seal material it is to be understood that the elastomeric nanoparticle seal compositions of this invention can be formulated for use as or more of the seal materials used to make the seal construction.

Further, FIGS. 3 to 8 illustrate example seals having particular configurations. It is to be understood that such illustrated configurations are provided for purposes of reference and that seal compositions according to principles of this invention are intended and understood to be used to make differently configured seals in addition to those specifically illustrated. Accordingly, it is to be understood that seal constructions comprising compositions described above can be configured differently to meet particular end-use applications and such differently configured seal constructions are understood to be within the scope of the invention.

Seals compositions and constructions formed according to principles of the invention may be better understood with reference to the following example.

A seal composition is prepared by polymerizing a fluoropolymer in the form of polytetrafluoroethylene in a reactor to obtain a desired nanometric latex size. Subsequently, the polytetraefluoroethylene latex is used as a seed and polymerization of a host elastomeric material in the form of a fluoroelastomer material is commenced. Upon completing the host elastomeric material polymerization, the resulting composition comprises a dispersion of nanoparticles formed from polytetrafluoroethylene in the polymeric matrix of the fluoroelastomeric material. The weight percentage of the nanoparticles within the host fluoroelastomeric material is within the ranges disclosed above. The nanoparticle containing fluoroelastomeric material is then combined with a further elastomeric material and any processing promoters, flow modifiers, curing agents, pigments and/or coloring agents, and/or additional fillers in the weight percentages disclosed above, and these materials are mixed together so that the nanoparticles and any additional fillers are substantially uniformly distributed. The resulting composition is either compression, transfer, or injection molded into a desired shape to form all or part of the seal.

In the above-noted example embodiment, the resulting seal composition comprised: approximately 37 percent by weight of the nanoparticles and host elastomeric material (e.g., one that is available under the product name Tecnoflon P959/30M from Solvey Solexis), where the nanoparticles comprise approximately 11 percent by weight of the total weight of the nanoparticles and the host elastomeric material; approximately 39 percent by weight of another elastomeric material (a fluoroelastomeric material that is available under the product name Tecnoflon P959); approximately 1.0 percent by weight of processing aid (one that is available under the product name Tecnoflon FPA 1); approximately 19 percent by weight of filler (one that is available under the product name Medium Thermal Black, ASTM designation N-990); approximately 3 percent by weight of cure promoter (Triallyl isocyanurate that is available under the product name TAIC DLC-A (Triallyl isocyanurate on silicon dioxide) from Natrochem, Inc.); and approximately 1.0 percent by weight of peroxide curing agent (2,5-dimethyl-2,5-di(tert-butylperoxy) hexane available under the product name VAROX DBPH-50 from R.T. Vanderbilt Company, Inc.).

Seals produced in the noted example displayed significantly improved overall physical properties such as higher modulus at lower strain levels, improved wear resistance (in some cases improved by 300 percent), low compression set and low stress relaxation for better sealability, improved high temperature properties, excellent resistance to greases, oils and fluids, when compared to seals produced from conventional materials not including the nanoparticles.

A feature of seals constructions formed from the compositions described above is that they display improved combined properties of modulus, elongation, hardness, compression set, chemical resistance, and temperature resistance when compared to seal constructions formed using conventional elastomeric or rubber materials. Such combination of performance properties were not before possible using conventional elastomeric or rubber materials that comprise conventional fillers, e.g., fillers that are simply added to the elastomeric material and that are not incorporated into the polymer having such improved combined performance properties is desired for the purpose of extending the service life of a end-use device, e.g., a rotary cone drill bit, that includes the same, thereby reducing operating expenses associated operating the end-use device and conducting the end-use application, e.g., drilling a subterranean formation.

Although, limited embodiments of seal and seal member constructions and compositions used to form the same have been described and illustrated herein, many modifications and variations will be apparent to those skilled in the art. Accordingly, it is to be understood that within the scope of the appended claims, that seal constructions and compositions used to form the same according to principles of this invention may be embodied other than as specifically described herein.

What is claimed is:

1. A rotary cone bit for drilling subterranean formations comprising:
    a bit body having at least one leg, the leg including a journal pin;
    a cutter cone rotatably mounted on the leg; and
    an annular elastomeric seal ring located between a first sealing surface on the leg and a second sealing surface on the cutter cone that forms a dynamic rotary seal between the leg and cutter cone while the cone is rotating, wherein the seal ring is formed from a material composition comprising:
    in the range of from about 0.2 to 65 percent by weight of a first elastomeric fluoropolymer material based on the total weight of the composition; and
    in the range of from about 10 to 95 percent by weight of a second elastomeric fluoropolymer material based on the total weight of the composition, the second elastomeric fluoropolymer material comprising a polymer matrix and a dispersion of particles disposed therein, wherein the particles are formed from a fluoropolymeric material and have an average size of less than about 100 nm, wherein the composition comprises in the range of from 10 to 90 percent by weight particles based on the total weight of the second elastomeric material and particles, and wherein the first elastomeric material and the second elastomeric material are mixed together so that the particles are substantially uniformly distributed therein.

2. The rotary cone bit as recited in claim 1 wherein the composition further comprises a solid filler having an average particle size of greater than 100 nm.

3. The rotary cone bit as recited in claim 1 wherein the seal ring comprises a dynamic sealing surface formed from the composition and another region that is formed from an elastomeric material different than the composition.

4. The rotary cone bit as recited in claim 1 wherein the seal ring comprises a first sealing surface and a second sealing surface, wherein each sealing surface has a different surface configuration.

5. The rotary cone bit as recited in claim 1 wherein the particles have an average particle size in the range of from about 30 to 80 nm.

6. The rotary cone bit as recited in claim 1 wherein the particles have an average particle size in the range of from about 35 to 55 nm.

7. The rotary cone bit as recited in claim 1 comprising from about 12 to 68 percent by weight particles based on the total weight of the particles and the second elastomeric material.

8. The rotary cone bit as recited in claim 1 comprising in the range of from about 20 to 95 percent by weight second elastomeric material based on the total weight of the composition.

9. The rotary cone bit as recited in claim 1 comprising in the range of from about 50 to 90 percent by weight second elastomeric material based on the total weight of the composition.

10. The rotary cone bit as recited in claim 1 comprising in the range of from about 70 to 80 percent by weight second elastomeric material based on the total weight of the composition.

11. The rotary cone bit as recited in claim 1 comprising in the range of from about 1 to 40 percent by weight first elastomeric material based on the total weight of the composition.

12. The rotary cone bit as recited in claim 1 comprising in the range of from about 2 to 12 percent by weight first elastomeric material based on the total weight of the composition.

13. The rotary cone bit as recited in claim 1 wherein the composition has a Shore A hardness at 25° C. of from about 65 to 90, a modulus of elasticity at 50 percent elongation in the range of from about 300 to 700 psi, has a modulus of elasticity at 100 percent elongation in the range of from about 750 to 1,500 psi., and has a maximum compression set after 25 percent deflection of an original height for a period of 22 hours at 212° F. of 12 percent.

14. A rotary cone bit for drilling subterranean formations comprising:
    a bit body having at least one leg, the leg including a journal pin;
    a cutter cone rotatably mounted on the leg; and
    an annular elastomeric seal ring, wherein the seal ring is formed from a material composition comprising:
        a first elastomeric fluoropolymer material; and
        a second elastomeric fluoropolymer material, wherein the second elastomeric material comprises a dispersion of particles disposed within a polymer matrix of the second elastomeric material, wherein the particles have an average size of less than about 100 nm and are formed from a fluoropolymeric material; and wherein the first elastomeric material and the second elastomeric material are mixed together so that the particles are substantially uniformly distributed therein.

15. The rotary cone bit as recited in claim 14 wherein the composition comprises in the range of from about 0.2 to 65 percent by weight of the first elastomeric material based on the total weight of the composition.

16. The rotary cone bit as recited in claim 14 wherein the composition comprises in the range of from bout 10 to 95 percent by weight of the second elastomeric material based on the total weight of the composition.

17. The rotary cone bit as recited in claim 14 wherein the seal ring has first and second sealing surfaces that are each configured having a different radius of curvature.

18. The rotary cone bit as recited in claim 14 wherein the seal ring further comprises a solid filler having an average particle size of greater than 100 nm.

19. The rotary cone bit as recited in claim 14 wherein the first elastomer material is substantially free of particles disposed within its polymer matrix.

20. The rotary cone bit as recited in claim 14 wherein the particles are formed from polytetrafluoroethylene.

21. The rotary cone bit as recited in claim 20 wherein the particles have an average particle size in the range of 30 to 80 nm.

22. The rotary cone bit as recited in claim 14 wherein the seal ring has an outer diameter sealing surface and an inner diameter sealing surface, wherein the inner and outer diameter sealing surfaces each have a different radius of curvature.

23. The rotary cone bit as recited in claim 22 wherein the one of the inner and outer diameter sealing surfaces is placed into dynamic sealing operation, and wherein the sealing surface placed into dynamic sealing operation is formed from the composition.

24. A rotary cone bit for drilling subterranean formations comprising:
    a bit body having at least one leg, the leg including a journal pin;
    a cutter cone rotatably mounted on the leg; and
    an annular elastomeric seal ring located between a first sealing surface on the leg and a second sealing surface on the cutter cone that forms a dynamic rotary seal between the leg and cutter cone while the cone is rotating, wherein the seal ring is formed from a material composition comprising a mixture of a first and second elastomeric fluoropolymer materials, wherein the mixture further comprises a plurality of fluoropolymeric particles uniformly dispersed therein, and wherein the particles have an average size of less than about 100 nm.

25. The rotary cone bit as recited in claim 24 wherein the particles are dispersed within a polymer matrix of one of the first and second elastomeric materials.

26. The rotary cone bit as recited in claim 24 wherein the material composition comprises in the range of from about 0.2 to 65 percent by weight of the first elastomeric material based on the total weight of the composition.

27. The rotary cone bit as recited in claim 26 wherein the particles are formed from polytetrafluoroethylene.

28. The rotary cone bit as recited in claim 24 wherein the material composition comprises in the range of from bout 10 to 95 percent by weight of the second elastomeric material based on the total weight of the composition.

* * * * *